May 9, 1967      W. RENOLD      3,319,051
DATA STRIP POSITIONING DEVICE
Filed Aug. 7, 1963      5 Sheets-Sheet 1
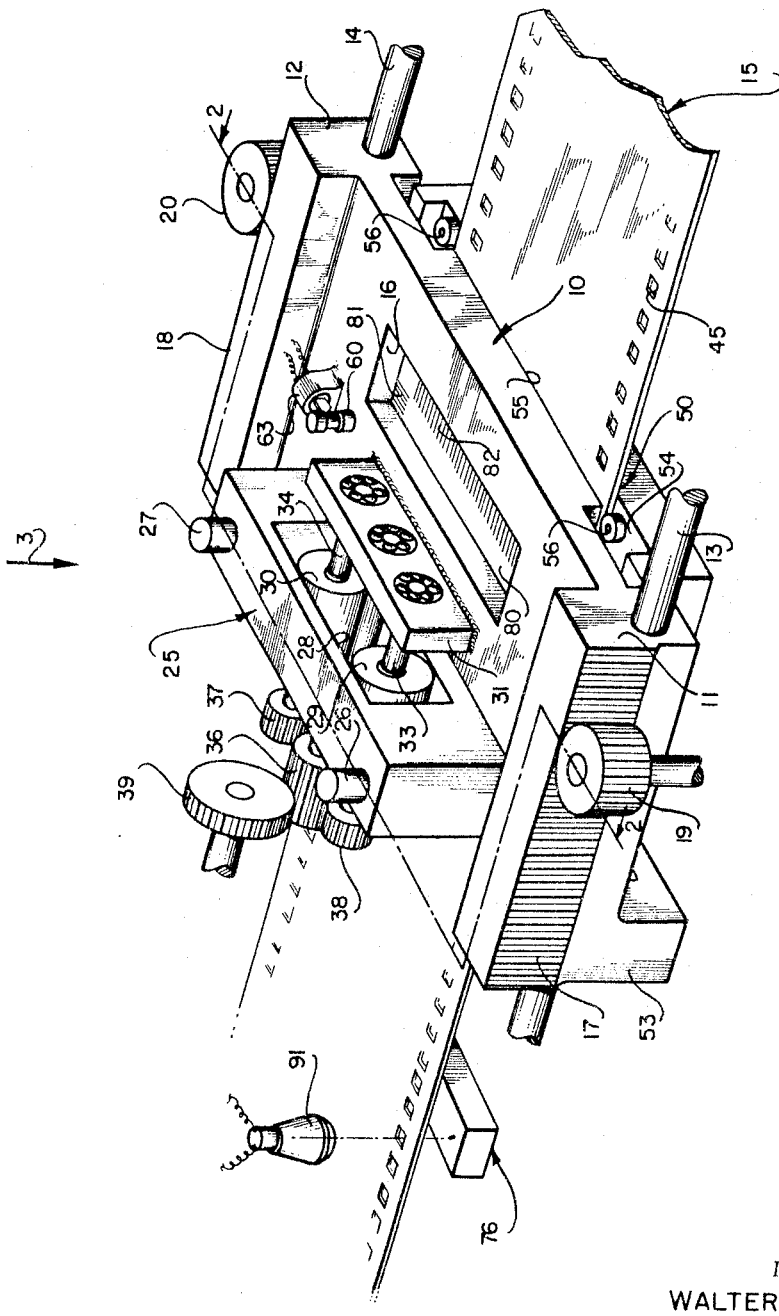
FIG_1
INVENTOR.
WALTER RENOLD
BY R. E. Geangue
Attorney May 9, 1967   W. RENOLD   3,319,051
DATA STRIP POSITIONING DEVICE
Filed Aug. 7, 1963   5 Sheets-Sheet 2
FIG_2
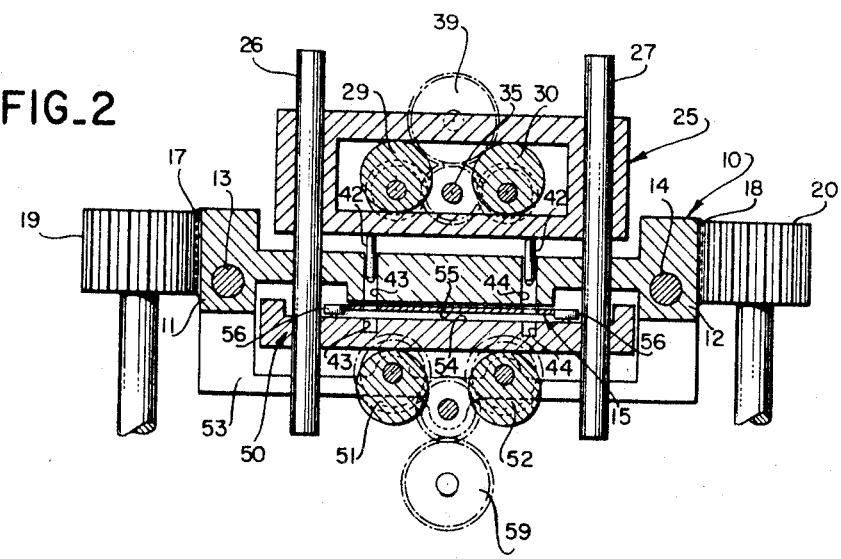
FIG_3
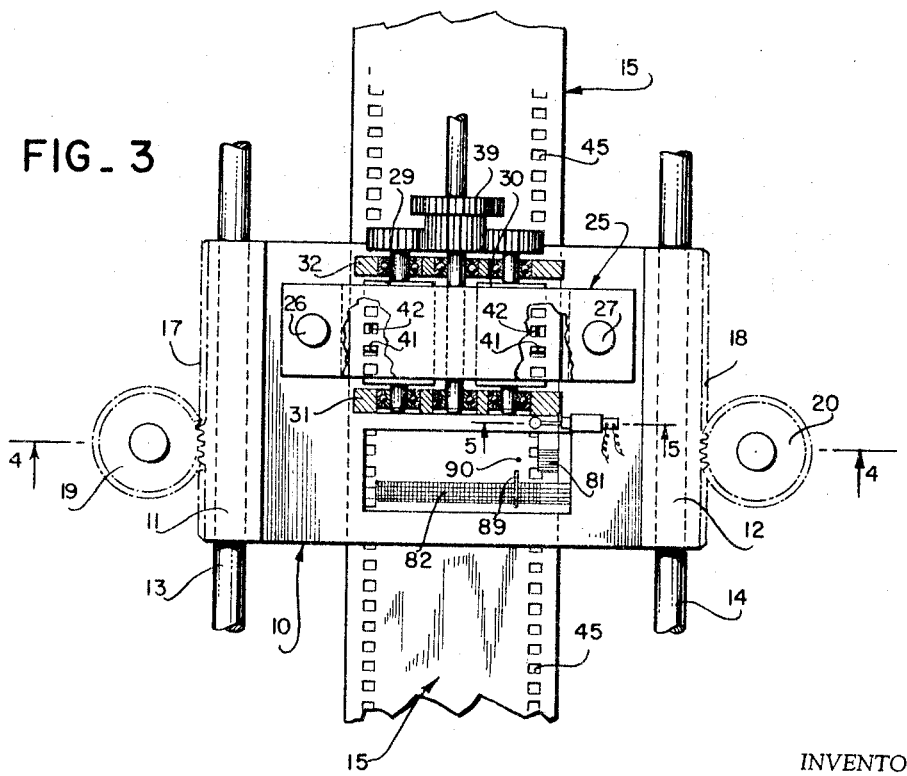
INVENTOR.
WALTER RENOLD
BY R.E. Geangae
Attorney May 9, 1967  W. RENOLD  3,319,051
DATA STRIP POSITIONING DEVICE
Filed Aug. 7, 1963  5 Sheets-Sheet 3
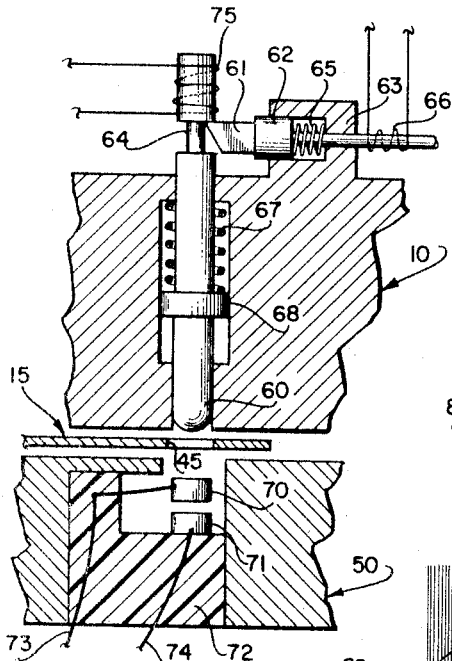
FIG_5
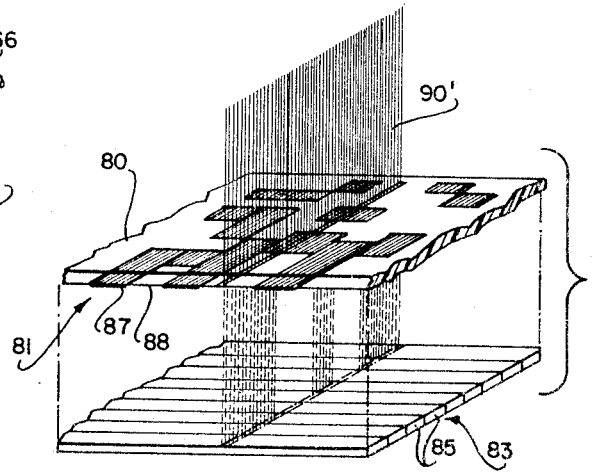
FIG_6A
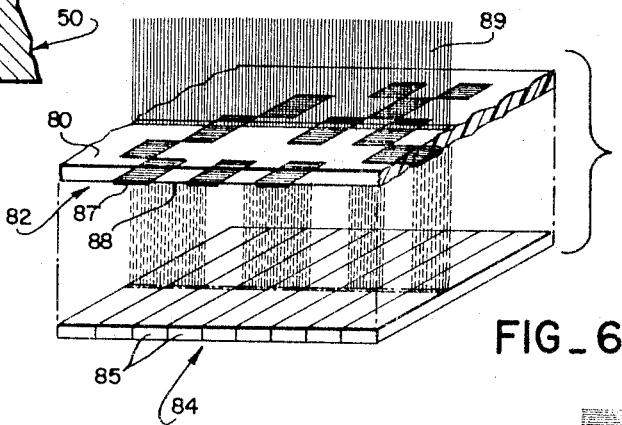
FIG_6B
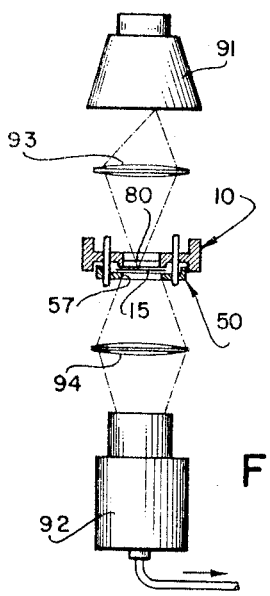
FIG_4
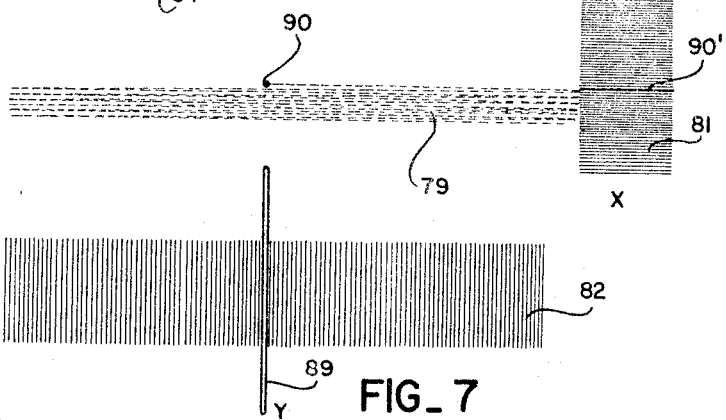
FIG_7
INVENTOR.
WALTER RENOLD
BY R. E. Geangue
Attorney

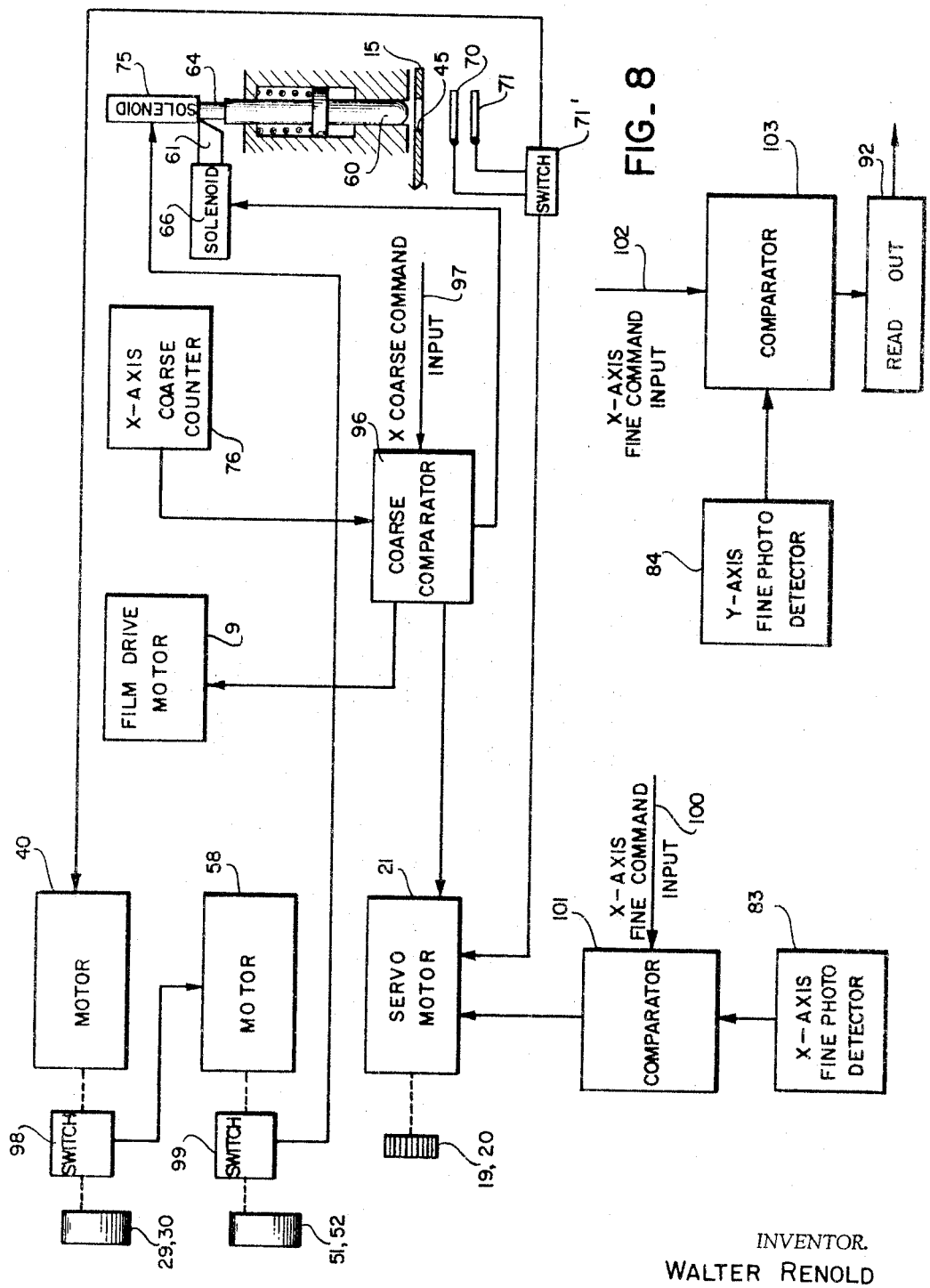

May 9, 1967
W. RENOLD
3,319,051
DATA STRIP POSITIONING DEVICE
Filed Aug. 7, 1963
5 Sheets-Sheet 5
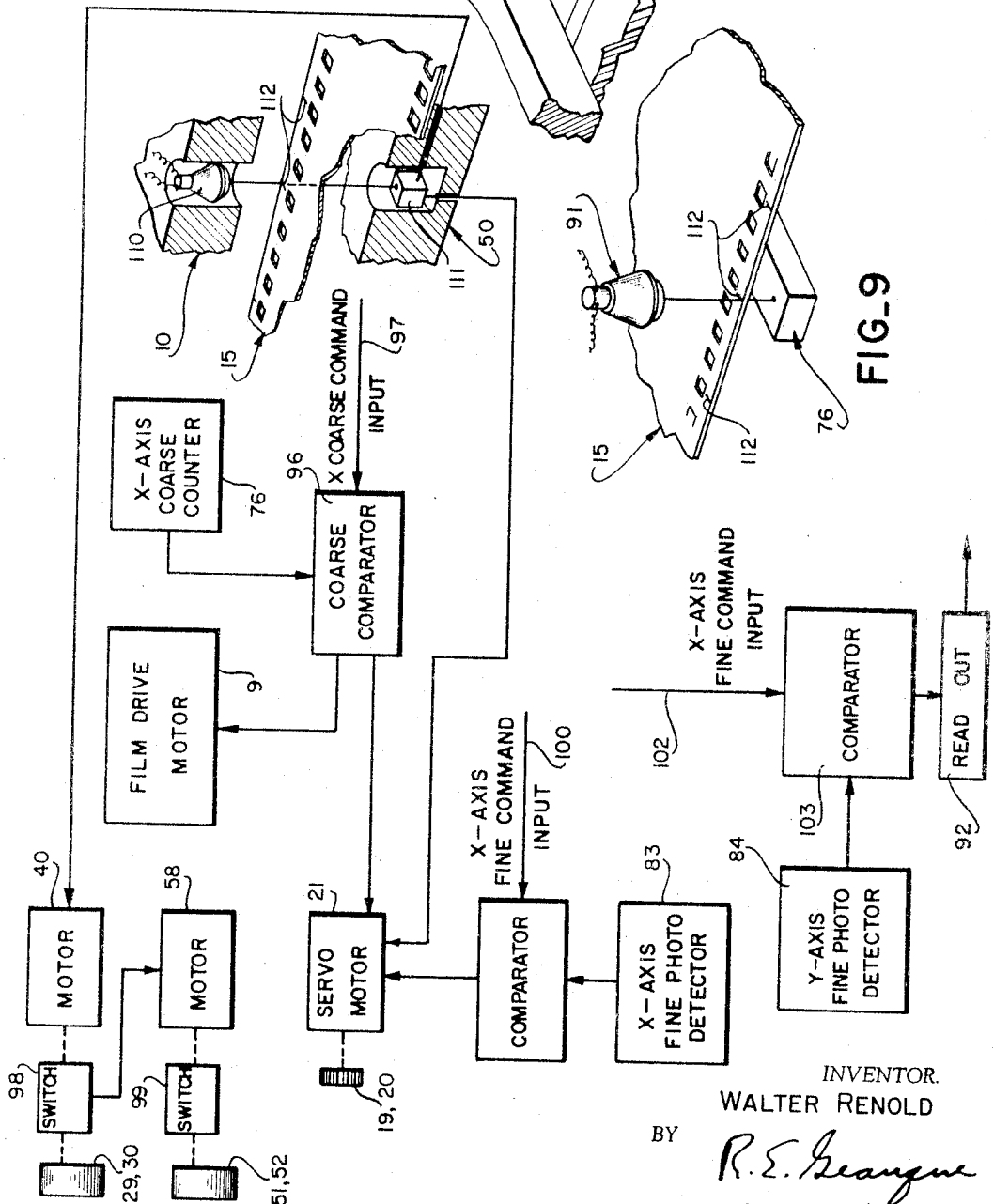
INVENTOR.
WALTER RENOLD
BY
R. E. Geangue
Attorney United States Patent Office 3,319,051
Patented May 9, 1967

3,319,051
DATA STRIP POSITIONING DEVICE
Walter Renold, North Hollywood, Calif., assignor to The Marquardt Corporation, Van Nuys, Calif., a corporation of California
Filed Aug. 7, 1963, Ser. No. 300,588
14 Claims. (Cl. 235—61.11)

This invention relates to a data strip positioning device, and more particularly to a device for positioning film relative to a filmgate in a coarse positioning mode during which the film moves relative to the filmgate and in a fine positioning mode during which the film and filmgate move together. The invention applies to devices with digital position access, both for digital and continuous tone data storage and retrieval.

Film is presently positioned with respect to a filmgate by counting the sprocket holes in the film and stopping the film at a predetermined sprocket hole. After stopping the film, the converging end of a registration pin is then usually inserted into the sprocket hole to secure the film and insure proper registration where the pin is fully inserted. However, this positioning system is not capable of use with film moving at high speeds since the film cannot consistently be stopped opposite the registration pin.

In the present invention, the coarse positioning mode also relies upon the counting of sprocket holes or other suitable marks and the use of registration pins but it is not necessary to stop at the preselected sprocket hole opposite the registration pins, since the filmgate can be moved to locate the preselected sprocket hole after the film drive is stopped. By counting sprocket holes or representative marks in the coarse access mode, it is possible to eliminate a coded coarse scale along the entire length of the film which would take up a very large portion of the film area otherwise available for data storage.

For fine scale precision access in digital data storage media, it has been the practice to place the positioning information on the film, interspersed with the data on the film, and up to one third of the storage space has been used for position reference. In the present invention, the fine positioning is obtained without any marks on the film. During fine positioning, the film and filmgate are locked together and are moved as a unit. The filmgate carries an X-axis fine scale which moves with the filmgate and the film relative to a fixed mount for a scanning light beam. The fine scale comprises an optical binary-coded strip and a photo-optical detector reads the position of the gate with respect to the fixed light beam mount in order to select the fine scale command position along the X-axis. A second binary-coded scale is positioned laterally on the filmgate and a second scanning light beam associated with an information data read-out spot moves across the second scale to continually provide a fine reading of the position of the read-out spot relative to the Y-axis of the film. Once the fine position along the X- and Y-axis is reached, the data read-out mode is initiated; the read-out spot continues to scan along the Y-axis, the filmgate slowly translates along the X-axis to read successive lateral lines of data on the film while the information read by the read-out spot is transmitted by a photoelectric sensor.

In access to continuous tone or pictorial presentations, the fine positioning mode does not require fine X-axis and Y-axis scales. Rather, after completion of coarse access, the filmgate moves, with the film, always precisely to the same null, or zero-reference, position.

It is therefore an object of the present invention to provide a data strip positioning device in which a coarse position of the film with respect to the read-out of projection means can be achieved with high film velocities and with great latitude as to position accuracy and then achieve high position accuracy in a fine access mode.

Another object of the invention is to provide a data strip positioning device in which the film and filmgate are moved together to arrive at a preselected film position with respect to a fixed reference.

Another object of the invention is to provide a data strip positioning device in which the filmgate carries X and Y position scales for positioning the filmgate and film as a unit along the X-axis and for supplying Y-axis position during read-out.

A further object of the invention is to provide a data strip positioning device in which precision location of the read-out unit is obtained without utilizing any film storage capacity for position indicaton.

These and other objects of the invention not specifically set forth above will become readily apparent from the accompanying description and drawings in which:

FIGURE 1 is a perspective view of the present invention showing the filmgate and film;

FIGURE 2 is a sectional view along lines 2—2 of FIGURE 1 showing the registration pins and clamping means for locking the film;

FIGURE 3 is a top plan view partly in section taken in the direction of arrow 3 of FIGURE 1 and showing the two pairs of film registration pins;

FIGURE 4 is a reduced sectional view along line 4—4 of FIGURE 3 showing the film positioned in the filmgate and illustrating in elevation the shaped beam scanner and the read-out photo tube;

FIGURE 5 is an enlarged sectional view along line 5—5 of FIGURE 3 showing the coarse positioning feeler pin;

FIGURE 6A is an expanded perspective view showing a section of the X-axis positioning scale and the associated photoelectric elements;

FIGURE 6B is an expanded perspective view showing a section of the Y-axis positioning scale and the associated photoelectric elements;

FIGURE 7 is an enlarged top plan view similar to FIGURE 3 showing the scanning pattern superimposed on the X and Y binary-coded scales;

FIGURE 8 is a schematic diagram of the data strip positioning device and data read-out system;

FIGURE 9 is a perspective view of the film used with a modified form of the invention;

FIGURE 10 is a modified schematic circuit for the modified form of the invention of FIGURE 9; and FIGURE 11 is a perspective view of a null scale which is utilized in a further modification of the invention.

The embodiment of the invention chosen for illustration comprises a base plate 10 having enlarged edges 11 and 12 which receive rods 13 and 14, respectively, for slidably mounting the base plate along the X-axis of movement. A film strip 15 is moved by motor 9 in the X direction underneath a rectangular opening 16 in the base plate 10. The edges 11 and 12 carry racks 17 and 18, respectively, which engage with drive pinions 19 and 20, respectively, and the drive pinions are driven by a servomotor 21 (see FIGURE 8) to move the base plate 10. It is understood that the rods 13, 14 and the pinion gear drive system are stationary with respect to the entire system.

A registration pin block 25 is slidably mounted on vertical guide pins 26 and 27 which extend through and are attached to the base plate. The block 25 has an opening 28 which contains cams 29 and 30 for vertically moving the block along the pins 26, 27 relatively to the base plate 10. Pillow blocks 31 and 32 are secured to plate 10 on opposite sides of block 25 and support the shafts 33 and 34 for cams 29 and 30, respectively, and the shaft 35 for pinion 36. Gears 37 and 38 on cam shafts 29 and 30, respectively, mesh with pinion 36 and a drive gear 39 engages pinion 36 in order to rotate the cams and move block 25. A servomotor 40 (see FIGURE 8) drives the gear 39, and the pinion 36 is large enough to permit it to move with the plate 10 along the X-axis while remaining in mesh with drive gear 39. This may also be accomplished by mounting gear 39 or pinion 36 on a splined shaft, permitting axial displacement, while maintaining the gears in mesh. Both the motor 40 and gear 39 are mounted on a frame which is stationary with respect to the system.

Two pairs of registration pins 41 and 42 are secured to the lower surface of block 25 and the pins pass through openings 43 and 44 in plate 10 (see FIGURE 2) and into separate sprocket openings 45 in the film 15 when block 25 is moved against plate 10 by cams 29, 30. The pins 41 are located ahead of pins 42 and are positioned laterally within the sprocket holes while pins 42 are located longitudinally within the sprocket holes (see FIGURE 3). Thus, pins 42 provide for 5-axis registration and pins 41 provide for Y-axis registration. When the block 25 is raised by cams 29, 30, the pairs of pins clear the film so that it can be rapidly moved past the opening 16.

A pressure plate 50 is located directly below base plate 10 and is also slidably supported by pins 26 and 27 for movement relative to plate 10 by cams 51 and 52 which are carried by a bracket 53 secured to plate 10. A gear system 59 similar to that for cams 29, 30 and driven by servomotor 58, is utilzed to rotate cams 51 and 52 in order to move surface 54 of plate 50 towards surface 55 of plate 10 in order to firmly clamp the film 15 therebetween. Suitable openings 43' and 44' are provided in plate 50 to clear the protruding registration pins. Rollers 56 on plate 50 serve to guide the film and maintain it under the opening 16 during motion of the film after the cams 51, 52 have moved pressure plate 50 away from base plate 10. The plate 50 has a transparent opening 57 (see FIGURE 4) in line with opening 16 to permit optical read-out of the data stored on the film. The plates 10 and 50 and the opening therein comprise the filmgate for the film.

A feeler pin 60 (see FIGURE 5) is slidably mounted in an opening in base plate 10 and a latch 61 has an enlarged portion 62 slidably mounted in a projection 63 on plate 10. The latch 61 is biased into a notch 64 in pin 60 by spring 65 and a solenoid coil 66, when energized, pulls latch 61 out of engagement with notch 64. Also, the pin 60 is urged downwardly in the direction of film 15 by a spring 67 located within plate 10 and acting against flange 68 on the pin. When the latch 61 is withdrawn, the pin 60 moves into engagement with the surface of film 15 until the base plate 10 is moved by gears 19 and 20 to place the pin 60 opposite a sprocket opening 45 so that the pin 60 can enter the perforation. A pair of electrical contacts 70, 71 located within a recess in pressure plate 50 and contact 70 is normally biased away from contact 71. After the pin 60 moves through a sprocket hole 45, it engages and forces the contact 70 against contact 71 to complete the electrical circuit through leads 73 and 74. The closing of this switch stops the movement of base plate 10 to locate a sprocket hole opposite pin 60 and initiates action of the servomotor 40 to cause cams 29, 30 to move registration pins 41, 42 into sprocket holes. Since the pin 60 is slightly smaller than a sprocket hole, the registration pins can move the film slightly to obtain exact registration for the coarse position. Solenoid 75 is operatively associated with the upper end of pin 60 in order to remove the pin upwardly and reset latch 61 after the registration pins 41, 42 have entered the sprocket holes. The film drive motor 9 is braked, prior to downward motion of pin 60, by coarse counter 76 which optically counts the sprocket holes and stops the film just past the selected one. Thereafter, reverse motion of the base plate locates the selected sprocket opening for pin 60.

The filmgate opening 16 contains a transparent window 80 (see FIGURE 4) which carries the X-axis vernier scale 81 and the Y-axis vernier scale 82. These scales 81, 82 are optically binary-coded and photo-optical detectors 83 and 84, respectively, are located below each scale between the window 80 and the film 15. FIGURE 6 is an expanded view in which the scales, window and detectors are separated for purposes of clarity and each detector consists of a separate photoelectric cell 85 for each separate channel on the associated scale which consists of opaque and transparent increments 87 and 88. The light pattern for scanning the scales 81 and 82 is illustrated in FIGURES 3 and 7 and consists of a line 89 moving over the Y-axis scale 82 and a dot 90 moving in successive paths across the scale 81. Referring to FIGURE 7, the scan pattern, consisting of line 89 and dot 90 which move together and resemble an exclamation mark, can be generated by a fixed, shaped beam C.R.T. scanner 91 by flooding a shaped matrix and moving the shaped beam by a deflection coil in front of the matrix in response to command signals.

During fine positioning along the X-axis, the film 15 is locked to the base plate 10 and the plate 10 is moved by pinions 19, 20. The X-axis scale 81 moves past an imaginary fixed line 90', traced by the fast moving dot part 90 of the beam, and the photoelectric cells 85 continually read the X position of the filmgate. During fine positioning along the Y-axis, the plate 10 and the Y-axis scale 82 are fixed and the line-shaped part 89 of the beam moves across the Y scale 82 to continually read the Y position of the spot 90 which, after being located in the fine mode, serves as the read-out spot. Thus, the binary code of scale 81 is read by the light line 90' which energizes only those photoelectric cells 85 opposite a transparent scale increment to provide the X position of the filmgate. In the same manner, the light line 89 energizes the photoelectric cells 85 below the Y scale 82 to provide the Y position of the dot 90.

After the command fine position of the spot 90 on the film is reached as determined by detectors 83 and 84, information stored on the film can be read out by moving the spot 90 in a scanning mode. The information stored on the film can be in binary code, it may be in the form of density steps in black and white film or in superimposed color layers, and the information can be arranged in successive lines 79 transversely across the film. Therefore, once the address on the film is reached, the read-out mode begins. The light line 89 scans the Y-axis scale and the spot 90 scans the data lines, while the filmgate translates very slowly in the X-axis. A read-out phototube 92 (see FIGURE 4) is located below the filmgate and receives the film density information from the film for transmission to electronic data handling equipment (not shown). At the same time, the positioning system receives current information of the spot location with respect to the film in both axes. The lenses 93 and 94 serve to properly direct the light from the scanner 91 to the window 80 and through the film to the phototube 92.

The data strip positioning device has three modes of operation, namely (a) coarse search mode, (b) fine search mode, and (c) data read-out mode. Referring to FIGURE 8, the original command signal to begin film positioning starts the film drive motor 9 to rapidly move the film 15 through the filmgate. During this time, the pressure plate 50 is in lowered position and the block 25 and pin 60 are raised in order to release the film from the pressure plate and from the pins 41, 42 and 60. The coarse position of the film is read by counter 76 and this information is introduced to coarse comparator 96 where it is compared with coarse X-axis input from command signal 97. When the command position count is reached, the comparator 96 stops the motor 9 so that the film is stopped in such a position that the beam of the coarse counter 76 is between the selected sprocket hole and the one next higher in count. After film stoppage, the servomotor 21 connected with comparator 96 moves the filmgate through pinions 19 and 20 in the direction of the lower count perforation. Also, upon film stoppage, the solenoid 66 connected with comparator 96 releases pin 60 to ride on film 15 and after short movement of the gate opposite to the previous coarse film motion, the pin will move into a sprocket hole 45 and acutate the switch 71'. This action will stop the servomotor 21 and will cause the servomotor 40 to move the conical tipped registration pins 41, 42 into sprocket holes to accurately position the film in the coarse mode. Thereafter, the servomotor 58 will be actuated by a position switch 98 on servomotor 40 in order to move the pressure plate 50 into holding engagement with the film. After positioning of pressure plate 50, the pin 60 will be retracted by energizing solenoid 75 with a position switch 99 associated with servomotor 58. The coarse positioning mode is now complete and the film is firmly gripped by the filmgate plates 10 and 50.

The fine mode of positioning now begins and the scanner 91 moves the spot 90 rapidly across the X-axis scale 81 to produce, in effect, a scan line by which fine X-axis position can be read out on photo detector 83. The X-axis position and the X-axis fine command 100 are compared in comparator 101 and the servomotor 21 connected with comparator 101, operates to move the filmgate and film together until the fine X-axis position is obtained. Thereafter, the photo detector 84 reads the Y-axis position of scan line portion 89 and this information is compared with the fine Y-axis input command 102 in comparator 103 in order to position the spot 90 at the fine Y-axis position. Once the spot 90 reaches the Y-axis position, read-out scanning will commence with the gate moving the film by the distance of one data line width along the X-axis for every scanning cycle. The scanning will continue until the stop command position of spot 90 in the X-axis and Y-axis is reached, which can be determined by the comparators 101 and 103.

The data material can be encoded on black and white film in binary code, or the information may be contained in density steps. Instead of black and white film, tripack color film may be used, with attendant increase in available density steps in a mark of equal size. Standard-type 70-mm. film perforations can be spaced at a pitch of .234±.001". Using, for example, a mark size of .001" square, 232 lines may be accommodated, located with reference to one perforation. The count of these lines in the X-axis vernier scale 81 would require an eight-channel binary-coded optical grid scale. Similarly, using 2¼" width in standard 70-mm. film for data storage to address 2250 marks of .001" width would require twelve channels in the Y-axis scale 28.

It is therefore apparent that the present invention can accomplish large-tolerance coarse positioning of high-speed film since it is not necessary that the film be stopped by the film drive exactly at its coarse position. In other words, the film can overrun its coarse position and the filmgate is then moved relative to the film to exactly establish the coarse position. Also, the fine positioning is accomplished by locking the film to the filmgate and utilizing scales on the filmgate to move the film to its final X-axis and Y-axis address.

In coarse positioning, instead of counting sprocket holes, optical marks placed near the film edge may be counted. While they are representing sprocket holes, these marks may be spaced at a distance a multiple of the perforation pitch. This further increases the coarse access tolerance. In this arrangement, as illustrated in FIGURES 9 and 10, the feeler pin 60 and contacts 70 and 71 are replaced by a light beam source 110 which is mounted on base plate 10 in the recess provided for pin 60 in the prior embodiment, and the photoelectric cell 111 is mounted in plate 50 in the recess provided for insulator 72 of the prior embodiment. In FIGURE 9, the optical marks 112 are placed opposite every fourth sprocket hole and photo detector 76 serves to stop the film so that photocell is between the selected mark and the one for the next higher count. The marks 112 are positioned with respect to their associated sprocket holes sufficiently accurately to permit free insertion of the registration pins 41, 42. After the film stops, the servomotor 21 is energized to reverse the film motion until the next mark 112 is located opposite photoelectric cell 111. The photo detector then engages motors 40 and 58 to insert the registration pins 41, 42 and move plate 50 into clamping position. Referring to FIGURE 10, the modified circuit for this embodiment is illustrated along with the fine positioning comparators which are also used with this modified system.

A further modification which can be utilized with the coarse command positioning of the system of FIGURE 10 is shown in FIGURE 11 wherein the X scale comprises a single mark 115 in a single channel and a single photocell 117 is utilized to locate the mark 115 and thereby locate the filmgate at a null position such as required in microfilm reading. In this modification, no Y scale will be utilized and the X scale is a simple positioning scale without a binary code.

Fine X-axis positioning may be accomplished by moving the scanning beam in the X-axis, instead of the gate, after coarse access is completed, registration pins inserted and the film is clamped in the gate. In data read-out with this arrangement, the gate remains stationary, and the beam performs the scanning motion in the X-axis as well as in the Y-axis, similar to television scanning.

It is apparent that a separate position read-out lightline can be utilized for the X-axis in place of the lightline traced by the spot 90. Also, a data read-out spot can be generated separately from the scanner beams for the X-axis and Y-axis position read-out. By placing scales on the filmgate, workable film area is not consumed by position information. Further, while binary-optical scales are utilized, other types of information scales can also be utilized, and strip information media other than photographic film could be employed and positioned by the invention. Various other modifications are contemplated by those skilled in the art without departing from the spirit and scope of the invention as hereinafter defined by the appended claims.

What is claimed is:
1. In a film positioning device,
a filmgate;
a film strip extending through said filmgate and having sprocket holes therein;
means for driving said film strip;
means responsive to the movement of said sprocket holes for braking said drive means;
feeler pin means carried by said filmgate and engaging said film strip adjacent a selected sprocket hole after stoppage of said film; and
means for moving said filmgate while said film is stationary to place said feeler pin in said selected hole.

2. In a film positioning device as defined in claim 1 having a pin block mounted for reciprocating toward and away from said filmgate and pin means carried by said block and movable into a plurality of sprocket holes while said feeler pin is in said selected hole for obtaining exact film registration with respect to said gate.

3. In a film positioning device,
a filmgate comprising a base plate and a brake plate;
a film strip extending between said plates;
means for moving said brake plate toward said base plate to clamp said film between said plates;
an X scale on said filmgate located in the direction of movement of said strip and a Y scale on said filmgate located transversely to said direction of movement;
means for reading each of said scales;
means for moving said filmgate and film relative to said reading means for obtaining a first position reading from said X scale; and
means for moving said reading means relative to said Y scale to obtain a second position reading from said Y scale.

4. In a film positioning device as defined in claim 3, means for coarsely positioning said film strip in said filmgate prior to movement of said brake plate to clamp said strip.

5. In a film positioning device as defined in claim 3, an opening through each of said plates in alignment with one another and with a portion of said film therebetween, and a window plate across the opening in said base plate, said X and Y scales being located on said window plate.

6. In a film positioning device as defined in claim 5, said X and Y scales comprising optical scales, said reading means comprising light beam producing means for scanning each of said scales.

7. In a film positioning device as defined in claim 6, wherein said light beam producing means includes a film read-out spot transversely scanning said film strip, and means for slowly moving said filmgate in the X direction during data read-out while said reading means continually provides X- and Y-axis position information.

8. In a film positioning device,
a filmgate comprising a base plate and a brake plate;
a film strip extending between said plates and having sprocket holes thereon;
means for driving said film strip;
means for counting sprocket holes and stopping said drive means at a predetermined position;
feeler pin means for engaging said sprocket holes after stoppage of said film;
means for moving said brake plate into engagement with said film to secure said film between said plates after insertion of said pin means;
read-out means for reading the data on said film strip;
scale means on said filmgate for providing the position of said read-out means in the direction of film movement and the position of said read-out means transversely to said direction;
means for moving said filmgate while reading one of said scale means; and
means for reading the other scale means when said filmgate is stationary.

9. In a data strip positioning device,
data strip mounting means;
a data strip extending through said mounting means and having registration means spaced thereon;
means for driving said data strip means responsive to said registration;
means for stopping said driving means;
means for moving said mounting means relative to said data strip means after said data strip is stopped; and
means carried by said mounting means and responsive to said registration means for controlling said moving means to locate said mounting means at a predetermined position along said data strip.

10. In a data strip positioning device as defined in claim 9, wherein said registration means comprise registration marks on said data strip, said controlling means comprising detector means carried by said mounting means for locating one of said registration marks.

11. In a data strip positioning device as defined in claim 10, wherein said data strip contains sprocket holes associated with said registration marks, and means operated after location of said mounting means for placing registration pins in said sprocket holes.

12. In a data strip positioning device as defined in claim 9, wherein said registration means comprise sprocket holes in said data strip, said controlling means comprises pin means carried by said mounting means for entering one of said sprocket holes.

13. In a data strip positioning device as defined in claim 9, having means for clamping said mounting means to said data strip after location of said mounting means in said predetermined position, X-axis and Y-axis binary scales carried on said mounting means, means for reading out data on said strip, and means responsive to said scales for adjusting the relative position of said scales and said read-out means along the X- and Y-axes in accordance with a position command input prior to data readout.

14. In a data strip positioning device as defined in claim 9, having means for clamping said mounting means to said data strip after location of said mounting means in said predetermined position, a null scale located on said mounting means along the direction of strip movement, and means for moving said mounting means to said null position after clamping of said data strip.

No references cited.

MAYNARD R. WILBUR, *Primary Examiner.*

D. W. COOK, *Assistant Examiner.*